United States Patent [19]
Mudd et al.

[11] Patent Number: 5,299,647
[45] Date of Patent: Apr. 5, 1994

[54] TINED ROTARY BLADE FOR CULTIVATORS

[75] Inventors: George W. Mudd, Baltimore, Md.; Thomas R. Lambrix, Wichita, Kans.

[73] Assignee: Schiller-Pfeiffer, Inc., Southampton, Pa.

[21] Appl. No.: 961,756

[22] Filed: Oct. 16, 1992

[51] Int. Cl.[5] ............................................. A01B 21/02
[52] U.S. Cl. ...................................... 172/555; 172/540
[58] Field of Search ............... 172/540, 555, 556, 604, 172/349, 123, 42; 56/255, 295

[56] References Cited

U.S. PATENT DOCUMENTS

| | | | |
|---|---|---|---|
| 2,755,718 | 7/1956 | Arndt | 172/42 |
| 2,847,924 | 8/1958 | Quick | 172/42 |
| 2,864,293 | 12/1958 | Edrich et al. | 172/42 |
| 3,123,149 | 3/1964 | White | 172/42 |
| 3,503,276 | 3/1970 | Vigot | 172/544 |
| 3,504,748 | 4/1970 | Croft | 172/42 |
| 3,650,334 | 3/1972 | Hagenstad | 172/540 |
| 4,133,390 | 1/1979 | Reaume | 172/43 |
| 4,421,176 | 12/1983 | Tuggle et al. | 172/41 |
| 4,629,007 | 12/1986 | Pegoraro | 172/556 |

FOREIGN PATENT DOCUMENTS 2558330  7/1985  France ................. 172/540

*Primary Examiner*—Clifford D. Crowder
*Assistant Examiner*—Michael A. Neas
*Attorney, Agent, or Firm*—Caesar, Rivise, Bernstein, Cohen & Pokotilow, Ltd.

[57] ABSTRACT

A rotary blade for use on a cultivator or rototiller. The blade comprises two disk-like members mounted on a hub having a central axis and a central opening to mount it for rotation about that axis. Each disk-like member has ten tines projecting generally radially outward. When viewed from the side each tine is generally triangular and has a pointed free end. One of the tines of each disk-like member is planar and is disposed parallel to a common plane located between the disk-like members and perpendicular to the hub, while the other nine of the tines of that member are bent or curved with respect to the common plane. In particular, three tines bent parallel to respective bend lines in a simple curve so that the respective free ends curves inward toward the common plane. Three other tines are a bent parallel to respective pairs of bend lines in a compound or serpentine curve having a first portion curving outward away from the common plane and a second portion curving inward toward the common plane. Three other tines are bent parallel to respective bend line in a simple curve so that their respective free ends curve outward away from the common plane. The disk-like members are mounted on the hub so that the pointed free ends of one member are interposed between the corresponding pointed free ends of the other member. The bend line(s) of each tine is (are) oriented at an angle of approximately seventy-two degrees from a radius extending from the central axis to the tip of the tine.

6 Claims, 3 Drawing Sheets

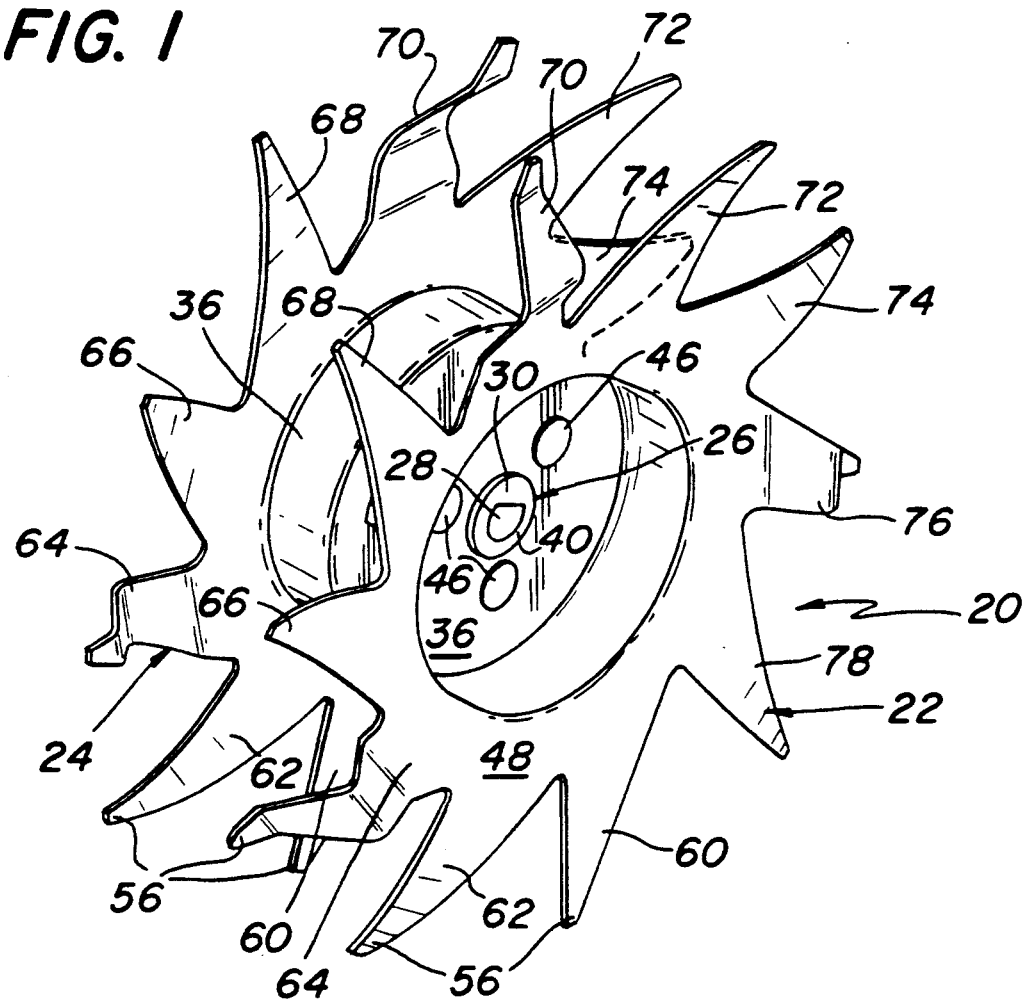
FIG. 1
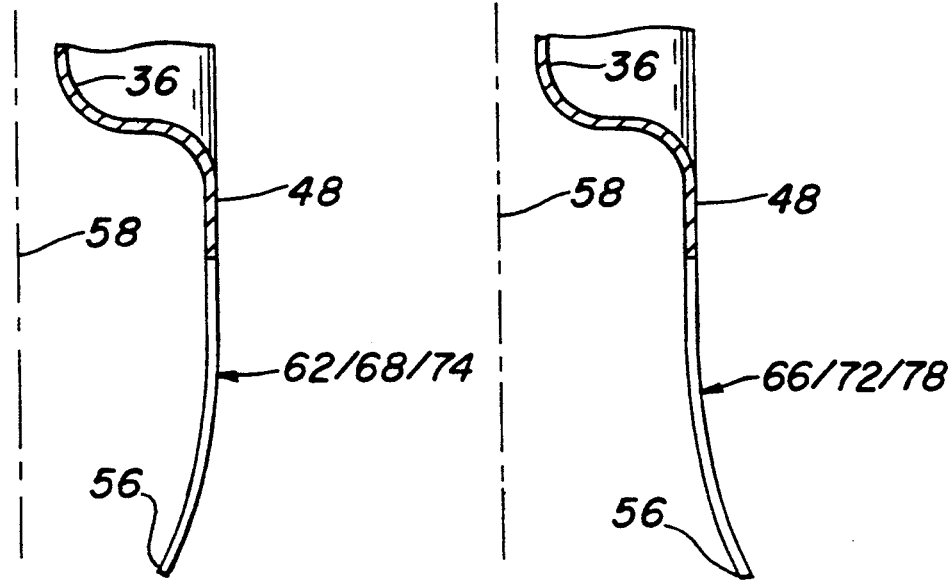
FIG. 5
FIG. 6

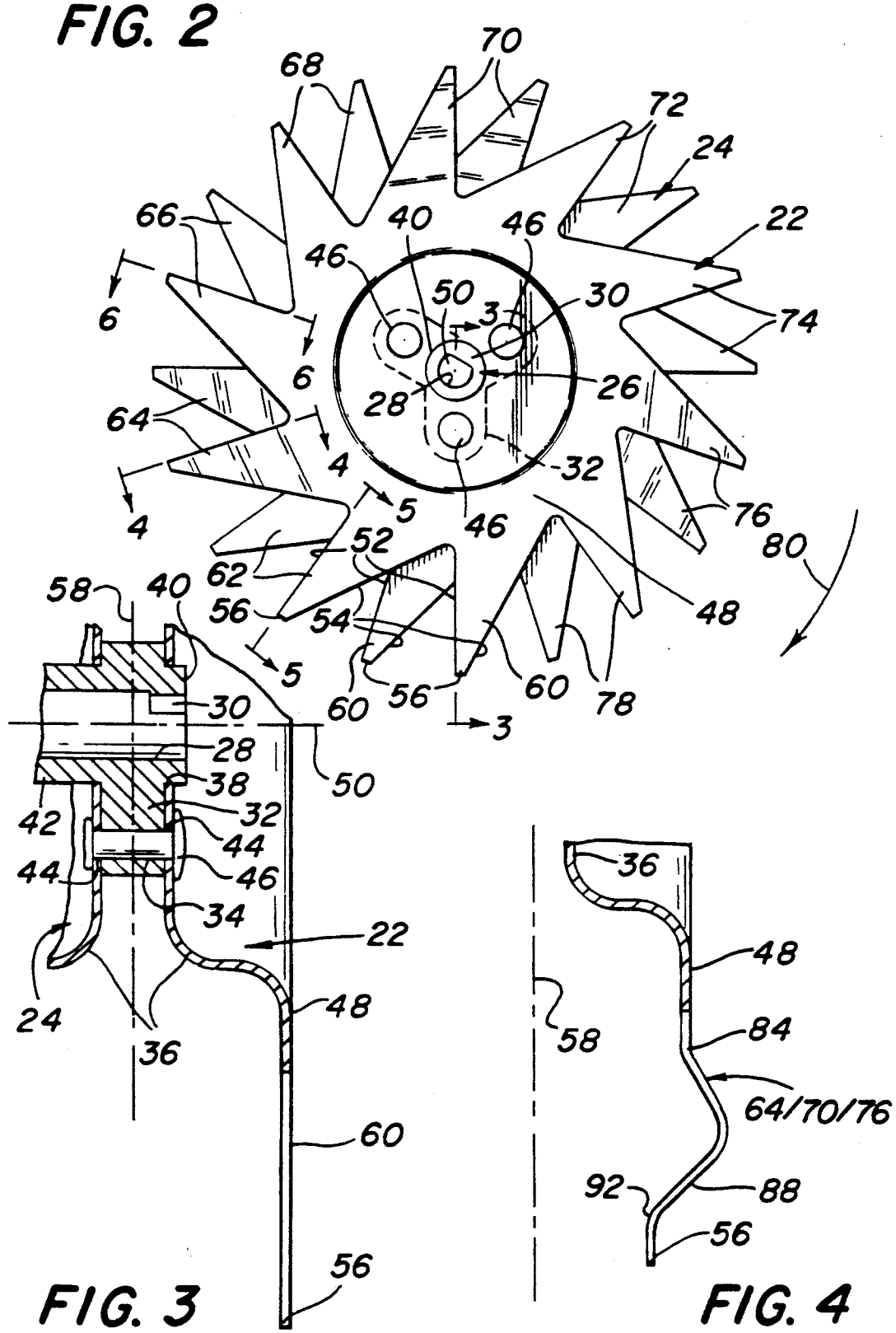

TINED ROTARY BLADE FOR CULTIVATORS

BACKGROUND OF THE INVENTION

This invention relates generally to gardening apparatus, and more particularly to a rotary blade for use on cultivators and rototillers.

When the home gardener tills the soil the objective is usually to provide a favorable soil environment for the germination and growth of a given crop. Ideally, the best till quality is achieved when the soil is broken up or pulverized into small pieces that allow free access to air and water. The patent literature discloses various rototillers or cultivators for suitable for home garden tilling/cultivating applications, such as: U.S. Pat. Nos. 2,755,718 (Arndt), 2,847,924 (Quick), 2,864,293 (Edrich et al.), 3,123,149 (White et al.) 3,503,276 (Vigot), 3,504,748 (Croft), 4,133,390 (Reaume), and 4,421,176 (Tuggle).

Small, light-weight, gasoline or electric powered home garden tillers have, in fact, become very popular and various models employing different tine arrangements are available in the market place. One particularly effective rototiller has been sold by the Mantis Manufacturing Company of Huntingdon Valley, Pa. under the trademark MANTIS TILLER/CULTIVATOR. That device makes use of a pair of rotary blades which are driven by a gasoline powered engine so that they roll along the soil to pulverize it. Each blade comprises two, nine-tined, disk-like members secured together by a hub which serves to mount the blade on the device's axle. All nine of the tines of each blade are of generally triangular shape and define a pointed free end when viewed from the side of the blade, but are curved in unique orientations when viewed from the edge of the blade, i.e., a direction parallel to the direction of cutting, so that they are effective to knock vegetation over and push it down into the soil, breaking the up as it goes. In particular, each disk-like member of each blade includes three type of curved tines. The first type of curved tine is bent into a simple curve so that its free end curves inward toward a common plane located between the disk-like members and perpendicular to their hub. The second type of curved tine, is a tine which is bent in a compound or serpentine curve having a portion curving outward away from the common plane and a portion curving inward toward the common plane, but with its free end parallel to the common plane. The last type of curved tine, is a tine which is bent in a simple curve so that its free end curves outward away from the common plane. Each tine of each disk-like member is bent parallel to a respective bend line which extends perpendicularly to the radius extending from the central axis of the blade to the tip of the tine. The tines alternate about the periphery of the disk-like member in the order of a first first type tine, a first second type tine, a first third type tine, a second first type tine, a second second type tine, a second third type tine, a third first type tine, a third second type tine, and finally a third third type tine.

While the blades of the MANTIS TILLER/CULTIVATOR are suitable for their intended purposes, they nevertheless leave something to be desired from the standpoint of functionality.

OBJECTS OF THE INVENTION

Accordingly, it is a general object of this invention to provide a rotary blade for cultivators and rototillers which overcomes disadvantages of the prior art.

It is a further object of this invention to provide a blade for small, light-weight, home garden rototillers or cultivators which provides a very effective, balanced operation.

It is a further object of this invention to provide a rotary blade for a rototiller or cultivator which exhibits enhanced performance in achieving soil mixing and pulverization.

It is a further object of this invention to provide a rotary blade for a rototiller or cultivator which is effective for efficiently breaking the soil from a solid into a sandy loam by progressive pulverization of the soil.

SUMMARY OF THE INVENTION

These and other objects of this invention are achieved by providing a rotary blade for use on a cultivator or rototiller. The rotary blade comprises of two disk-like members and an intermediate hub. Each of the disk-like members are fixedly secured to the intermediate hub. The intermediate hub serves to mount the rotary blade on the cultivator or rototiller so that the blade may be rotated about a central axis of the intermediate hub.

Each of the disk-like members comprises a central portion to which the hub is connected and has plural, e.g., ten, tines projecting radially outward from the central axis. Each of the tines has a free end portion. At least a first one of the tines comprises a simple curve whose free end portion is bent in a direction parallel to a first bend line, whereupon that free end portion is directed generally inward towards a common plane located between the disk-like members and perpendicular to the hub. At least a second of the tines comprises a compound curve having a first portion and a second portion, with first portion being bent in a direction parallel to a second bend line, whereupon that first portion is directed generally outward away from said common plane, and with the second portion being bent in a direction parallel to a third bend line, whereupon the second portion is directed generally inward towards the common plane. At least a third one of the tines comprises a simple curve whose free end portion is bent in a direction parallel to a fourth bend line, whereupon that free end portion is directed generally outward away from the common plane.

In accordance with one aspect of this invention, each of the bend lines extends at a an angle of less than ninety degrees to a radius from the central axis to the tip of the tine.

In accordance with another aspect of this invention each disk-like member comprises a fourth tine which is substantially planar and is oriented parallel to the common plane.

In fact, in accordance with a preferred embodiment of the invention the blade comprises ten tines on each disk-like member, with the sequence of the first, second, and third tines repeating a total of three times about the periphery of that member after the fourth tine. Moreover, the disk-like members are preferably mounted with respect to each other so that the free end portions of the tines of one disk-like member are interposed between the corresponding free end portions of the tines of the other disk-like member.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is an isometric view of the preferred embodiment of the tined rotary blade in accordance with the invention;

FIG. 2 is a reduced plan view of the preferred embodiment of the tined rotary blade shown in FIG. 1;

FIG. 3 is an enlarged sectional view taken along line 3—3 of FIG. 2;

FIG. 4 is an enlarged sectional view taken along line 4—4 of FIG. 2;

FIG. 5 is an enlarged sectional view taken along line 5—5 of FIG. 2;

FIG. 6 is an enlarged sectional view taken along line 6—6 of FIG. 2;

DETAILED DESCRIPTION OF THE PREFERRED EMBODIMENTS

Figure 7:
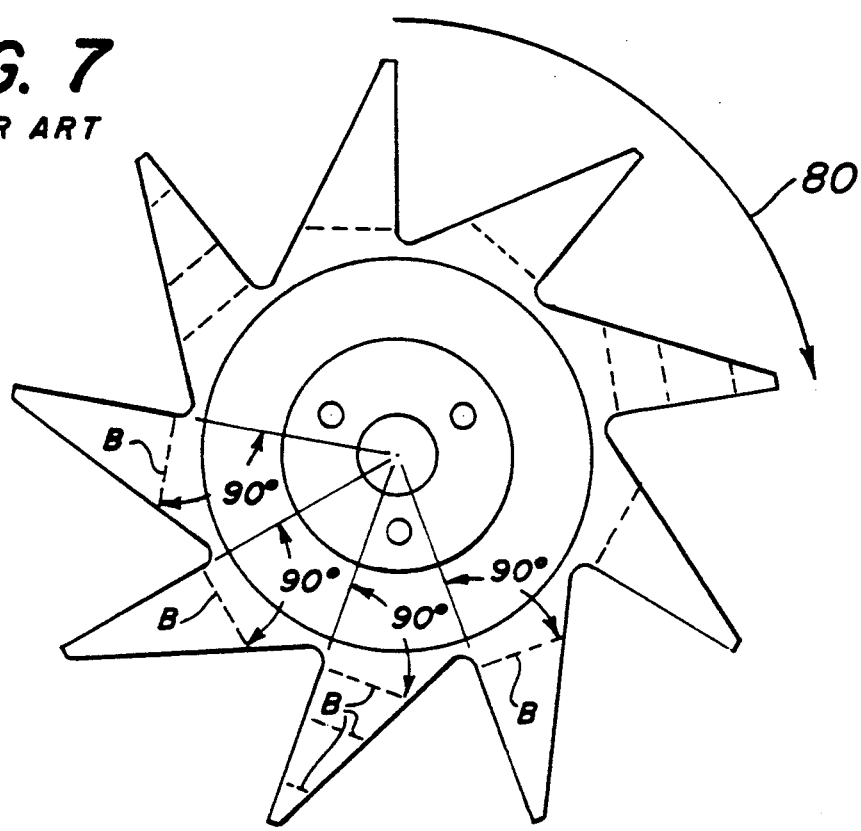
FIG. 7 is a plan view of one of the disk-like members of the Prior Art MANTIS TILLER/CULTIVATOR.

Referring now to various figures of the drawing wherein like reference characters refer to like parts, there is shown at blade 20 in FIG. 1 a rotary blade constructed in accordance with this invention for use on any tiller/cultivator, although it is of particular utility with the heretofore identified MANTIS TILLER/CULTIVATOR (not shown). The blade 20 basically comprises two, disk-like members 22 and 24, formed of any suitable material, hardened steel, and an intermediate hub 26, also preferably of steel, to which the disk-like members are fixedly secured.

Turning now to FIGS. 2 and 3 it can be seen that the hub 26 is of conventional construction like the hub of the prior art blade on the MANTIS TILLER/CULTIVATOR described heretofore, and thus includes an internal circular axial opening 28 which is partially closed at one end by stop 30 to facilitate a key fitting with the rotary drive axial (not shown) of the tiller/cultivator. The hub 26 includes a central flanged portion 32 having three arms, each extending at a 120 degrees to the other. Each arm has a hole 34 therein, also disposed at that same angle, to mount the disk-like members 22 and 24 on the hub.

Each disk-like member includes a recessed central portion 36. The central portion 36 includes a central circular hole 38. The hole 38 of the disk-like member 22 is arranged to receive a short height circular central portion 40 of the hub 26 therethrough, while the hole 38 in the disk-like member 24 receives a boss-like centrally located extension 42 of the hub therethrough. The boss-like extension 42 includes means (not shown) to secure the hub to the drive axle of the tiller/cultivator.

The central portion of each disk-like member 22 and 24 also includes three holes 44 disposed at 120 degrees from each other. The holes 44 are arranged to be aligned with the holes 34 in the flanged portion 32 of the hub and to have respective rivets 46 extended therethrough to fixedly secure the disk-like members to the hub as shown in FIG. 3.

As can be seen in FIGS. 1 and 2, each disk-like member 24 also includes a raised, generally planar, peripheral portion 48 extending about the depressed central portion 36 and from which the plural tines or teeth of the disk-like member extend. In the preferred embodiment of the invention shown herein, each disk-like member 22 and 24 consists of ten teeth or tines, 60, 62, 64, 66, 68, 70, 72, 74, 76, and 78, each being approximately 4.5 inches (11.43 cm.) in length measured radially from the axis of rotation or central axis 50 (FIG. 3) of the device. Each tine of the blade extends generally radially from the central portion of each disk-like member and consist of leading edge 52 which lies along a radius from the central axis 50. Each leading edge is thus located 36 degrees from the next leading edge 50. Each tine also includes a trailing edge 54 which is cut back at an acute angle to the leading edge to form a triangularly shaped tooth or tine having a pointed free end 56.

In order to provide a superior performance in achieving soil mixing and pulverization, nine of the tines on each disk-like member namely tines 62–78, are bent in three different configurations with respect to a common plane 58 (FIG. 3) which is disposed equidistantly between the disk-like members 22 and 24 and perpendicular to the axis of rotation, i.e., central axis 50. The remaining tine of each disk-like member, namely tine 60, is planar and extends generally parallel to the heretofore identified common plane.

Figure 8:
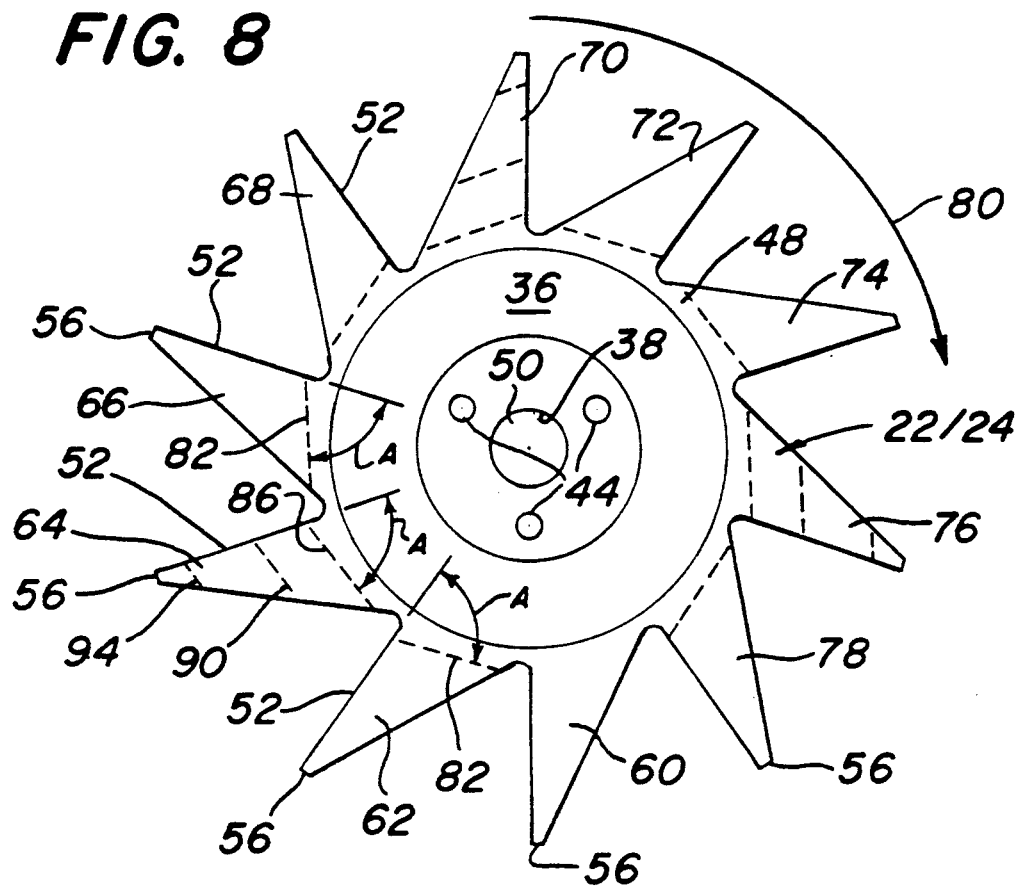
FIG. 8 is an enlarged plan view of one of the disk-like members of the blade shown in FIG. 1.

The next, e.g., second, tine from tine 60 in the counterclockwise direction in FIGS. 1 and 2 (which is the direction of rotation of the blade shown by arrow 80 in FIG. 2) is tine 62. As can be seen clearly in FIG. 5, the tine 62 is bent in an arc or simple curve toward the common plane 58. The arcuate portion of tine 60 emanates from the peripheral portion 48 at bend line 82 which is graphically represented by the dotted line in FIG. 8. Thus, as can be seen in FIG. 8, the bend line 82 extends at an angle "A" to the leading edge 52 of that tine.

In accordance with one preferred aspect of this invention, the angle "A" is less than 90 degrees to cause the tine to lift the soil as the blade rotates therethrough to provide for effective soil pulverization, as will be described later. In particular, and in accordance with a preferred embodiment of the invention, the angle "A" is approximately 72 degrees. The radius of curvature of the arcuate portion of tine 62 is 0.375 inch (0.95 cm.) and commences at a radial distance 3.062 inches (7.78 cm.) from the central axis 50.

The next sequentially located tine, i.e., 64, is of a compound or serpentine curve as seen clearly in FIG. 4. Thus, the tine 64 includes an arcuate portion 84 which starts to bend outward away from the common plane 58 starting at a bend line 86 (graphically represented by the dotted line in FIG. 8). The bend line 86 extends at the same angle to the leading edge 52 of the tine 64 as the bend line 82 does to the leading edge 52 of the tine 62, namely, 72 degrees. The radius of curvature of the bent portion 84 is approximately 0.188 inch (0.48 cm.) and commences at a radially distance of 2.855 inches (7.25 cm.) from the axis 50. The next contiguous portion 88 of the tine 64 bends inward towards the common plane 58 from a bend line 90 (graphically represented by the dotted line in FIG. 8). The bend line 90 extends parallel to the bend line 86. The radius of curvature of the bent portion 88 of tine 64 is approximately 0.25 inch (6.35 cm.) and commences at a radial distance of 3.475 inches (8.83 cm.) from the axis 50. The next contiguous portion 92 of the tine 64 bends back outward away from the common plane 58 from a bend line 94 (graphically represented by the dotted line in FIG. 8). The radius of curvature of the bent portion 92 of the tine 64 is approximately 0.25 inch (0.64 cm.) and commences at a radial distance of 4.25 inches (10.8 cm.) from the axis 50. The free end 56 of the tine lies substantially parallel to the common plane. The bend line 94 is also parallel to the bend lines 86 and 90.

The next sequentially located tine is 66 and, as can be seen in FIG. 6, is bent in an arc or simple curve away from the common plane 58. The arcuate portion of the tine 66 is configured exactly like the arcuate portion of tine 62 with the same radius of curvature and curvature starting point except that it curves outward. Thus, tine 64 starts to curve outward from a bend line 42 which extends at the same angle to the leading edge of that tine, namely, 72 degrees, as described heretofore.

The tines 68 and 74 are constructed identically to the tine 62, the tines 70 and 76 are constructed identically to the tine 64, and the tine 72 and 78 are constructed identically to the tine 66, so that the pattern of the tines after tine 60 repeats three times about the periphery of the disk-like member.

As can be seen in FIG. 2, the disk-like members 22 and 24 are mounted on the hub 26 so that their respective tines are interleaved, i.e., the tips of the tines of the disk-like member 24 lie equidistantly between the tips of the corresponding tines of the disk-like member 22. Thus, in the disclosed embodiment of ten tines, the leading edges of tines 60 of the disk-like members 22 and 24 are displaced by eighteen degrees from each other, as are the leading edges of the tines 62, 64, and so forth and so on.

In FIG. 7 there is shown a plan view, similar to that of FIG. 8 of one disk-like member of the prior art MANTIS TILLER/CULTIVATOR blade. As can be seen therein, the bend line "B" for each of the tines of that prior art blade extends at an angle of 90 degrees to the leading edge of the tine. This is to be contrasted with the bend lines 82, 86, 90, and 94 of the blade shown in FIG. 8 described heretofore which extend at an angle substantially less than 90 degrees. The angled orientation of the bends of the tines 62-78 of the blades of this invention ensures that a upon the rotation of the blade, the curved tines will act to lift the soil upward and then carry it back downward, whereupon it is repeatedly cut or pulverized. Moreover, the straight or planar blade 60 serves as a knife edge to further the cut or pulverize the soil particles. Thus, the combined action of the tines of the inventive blade produces a very fine loamy soil.

Without further elaboration, the foregoing will so fully illustrate our invention that others may, by applying current or future knowledge, adopt the same for use under various conditions of service.

We claim:

1. A rotary blade for use on a cultivator or rototiller to roll along and engage the soil, said rotary blade comprising a pair of disk-like members and an intermediate hub having a central axis to which said members are fixedly secured, said hub serving to mount said blade on said cultivator or rototiller so that it may be rotated about said central axis, each of said disk-like members comprising a central portion to which said hub is connected and three first tines, three second tines, three third tines, and a fourth tine, each of said tines projecting generally radially outward from said central axis, each of said tines having a free end portion, each of said first tines comprising a simple curve whose free end portion is bent in a direction parallel to a first bend line, whereupon said free end portion of each of said first tines is directed generally inward towards a common plane located between said disk-like members and perpendicular to the hub, each of said second tines comprising a compound curve having a first portion and a second portion, said first portion of each of said second tines being bent in a direction parallel to a second bend line, whereupon said first portion of each of said second tines is directed generally outward away from said plane, said second portion of each of said second tines being bent in a direction parallel to a third bend line, whereupon said second portion of each of said second tines is directed generally inward towards said plane, each of said third tines comprising a simple curve whose free end portion is bent in a direction parallel to a fourth bend line, whereupon said free end portion of each of said third tines is directed generally outward away from said plane, each of said bend lines extending at an angle of less than ninety degrees to a radius from said central axis to the tip of said tine, said fourth tine being planar and disposed parallel to said common plane, said tines of each of said disk-like members being disposed in the sequence of said fourth tine, a first one of said first tines, a first one of said second tines, a first one of said third tines, a second one of said first tines, a second one of said second tines, a second one of said third tines, a third one of said first tines, a third one of said second tines, and a third one of said third tines.

2. The rotary blade of claim 1 wherein said angle is approximately seventy two degrees.

3. The rotary blade of claim 1 wherein said free end portions of one of said disk-like members are located between the free end portions of the other of said disk-like members.

4. The rotary blade of claim 3 wherein each of said disk-like members comprises a peripheral portion disposed about said central portion, with said tines projecting generally radially outward from said peripheral portion, and wherein each of said tines comprising a leading edge and a trailing edge which merge together to form a pointed free end portion.

5. The rotary blade of claim 1 wherein each of said disk-like members comprises a peripheral portion disposed about said central portion, with said tines projecting generally radially outward from said peripheral portion, and wherein each of said tines comprising a leading edge and a trailing edge which merge together to form a pointed free end portion.

6. The rotary blade of claim 1 wherein said central portion is recessed.

* * * * *